United States Patent
Ravedati et al.

(10) Patent No.: US 10,508,753 B2
(45) Date of Patent: Dec. 17, 2019

(54) VALVE ASSEMBLY WITH ASSOCIATED MEASUREMENT DEVICE

(71) Applicant: ELBI INTERNATIONAL SPA, Turin (IT)

(72) Inventors: Paolo Ravedati, Moncalieri (IT); Ugo Gaino, Gabiano (IT); Giorgio Buffolo, Bra' (IT); Maurizio Rendesi, Villarbasse (IT); Giorgio Molino, Givoletto (IT)

(73) Assignee: ELBI INTERNATIONAL SPA, Turin (IT)

( * ) Notice: Subject to any disclaimer, the term of this patent is extended or adjusted under 35 U.S.C. 154(b) by 0 days.

(21) Appl. No.: 15/767,955

(22) PCT Filed: Oct. 5, 2016

(86) PCT No.: PCT/IB2016/055952
§ 371 (c)(1),
(2) Date: Apr. 12, 2018

(87) PCT Pub. No.: WO2017/064591
PCT Pub. Date: Apr. 20, 2017

(65) Prior Publication Data
US 2018/0299028 A1     Oct. 18, 2018

(30) Foreign Application Priority Data

Oct. 12, 2015 (IT) .......................... 102015000060359

(51) Int. Cl.
*F16K 37/00* (2006.01)
*F16K 11/24* (2006.01)
*F16K 31/06* (2006.01)

(52) U.S. Cl.
CPC ............ *F16K 37/005* (2013.01); *F16K 11/24* (2013.01); *F16K 31/0655* (2013.01); *Y10T 137/7761* (2015.04); *Y10T 137/87877* (2015.04)

(58) Field of Classification Search
CPC ....... Y10T 137/7761; Y10T 137/87877; F16K 37/005; F16K 31/0655; F16K 11/24; F17D 5/02
(Continued)

(56) References Cited

U.S. PATENT DOCUMENTS 5,000,224 A * 3/1991 Olson, Jr. ............. F16K 31/402
                                              137/487.5
5,038,820 A * 8/1991 Ames ...................... F16K 31/02
                                              137/460
(Continued)

OTHER PUBLICATIONS

Int'l Preliminary Report on Patentability from Int'l Appl'n No. PCT/IB2016/055952, dated Jan. 5, 2018.
(Continued)

*Primary Examiner* — William M McCalister
(74) *Attorney, Agent, or Firm* — Merchant & Gould P.C.

(57) ABSTRACT

A valve assembly includes a valve body, having an inlet duct, an outlet duct and an intermediate portion. An electrovalve is located proximal to the intermediate portion. A measurement device is directly connected to the valve body. The measurement device includes a sensor for taking a measurement for determining a physical characteristic of the fluid that can flow in the valve assembly. The electrovalve includes a first electronic circuit for conducting an electric control signal from a control unit to the electrovalve. The measurement device includes a second electronic circuit for conducting the electric signals exchanged between the control unit and the sensor. The first electronic circuit and the second electronic circuit are implemented on a single header (Continued)

or printed circuit board. The electrovalve and the measurement device are mechanically connected directly to the single header or printed circuit board.

12 Claims, 7 Drawing Sheets

(58) Field of Classification Search
USPC .................................................. 137/487.5
See application file for complete search history.

(56) References Cited

U.S. PATENT DOCUMENTS

| | | | | |
|---|---|---|---|---|
| 5,409,037 | A * | 4/1995 | Wheeler | G01M 3/243 137/487.5 |
| 5,771,920 | A * | 6/1998 | Jewett | E03B 7/071 137/460 |
| 5,893,388 | A * | 4/1999 | Luker | E03B 7/071 137/456 |
| 6,105,607 | A * | 8/2000 | Caise | F16K 31/402 137/487.5 |
| 6,209,576 | B1 * | 4/2001 | Davis | E03B 7/071 137/487.5 |
| 6,308,725 | B1 * | 10/2001 | Lawlyes | G05D 16/2013 137/14 |
| 6,374,846 | B1 * | 4/2002 | DeSmet | E03B 7/071 137/15.01 |
| 6,401,741 | B1 * | 6/2002 | Cain | F16K 17/32 137/10 |
| 6,860,288 | B2 * | 3/2005 | Uhler | F17D 5/06 137/312 |
| 6,880,574 | B1 * | 4/2005 | Porto | F16K 31/06 137/486 |
| 6,895,788 | B2 * | 5/2005 | Montgomery | A47L 15/421 137/312 |
| 7,308,824 | B2 * | 12/2007 | Trescott, Jr. | G01M 3/002 73/204.11 |
| 7,383,851 | B2 * | 6/2008 | Jacobsen | F16K 31/0637 137/14 |
| 7,671,754 | B2 * | 3/2010 | Heilmann | G01M 3/186 200/61.04 |
| 8,192,318 | B2 * | 6/2012 | Collins | F16H 59/68 475/127 |
| 8,689,829 | B2 * | 4/2014 | Meikle | G01F 1/28 137/624.12 |
| 2001/0003286 | A1 * | 6/2001 | Philippbar | G01M 3/243 137/624.12 |
| 2001/0018927 | A1 * | 9/2001 | Gill | G05D 7/0635 137/487.5 |
| 2002/0112765 | A1 | 8/2002 | Frank et al. | |
| 2007/0289647 | A1 | 12/2007 | Ravedati | |
| 2008/0142098 | A1 * | 6/2008 | Burlage | F17D 5/06 137/624.11 |
| 2008/0163936 | A1 * | 7/2008 | Boger | F15B 5/006 137/455 |
| 2008/0223951 | A1 * | 9/2008 | Tracey | A01G 25/16 239/71 |
| 2009/0114865 | A1 * | 5/2009 | Homann | B60T 8/3675 251/129.15 |
| 2010/0045471 | A1 * | 2/2010 | Meyers | G01M 3/18 340/605 |
| 2011/0284781 | A1 * | 11/2011 | Keller | F02M 25/0836 251/129.15 |
| 2012/0234409 | A1 * | 9/2012 | Klicpera | B05B 12/004 137/551 |
| 2012/0273069 | A1 * | 11/2012 | Klicpera | B05B 12/008 137/551 |
| 2014/0230925 | A1 * | 8/2014 | Halimi | G05D 16/20 137/487.5 |
| 2014/0238511 | A1 * | 8/2014 | Klicpera | E03B 7/071 137/551 |
| 2015/0204701 | A1 * | 7/2015 | Klicpera | G01M 3/00 137/624.11 |
| 2016/0077531 | A1 * | 3/2016 | Kucera | F23N 1/002 137/2 |

OTHER PUBLICATIONS

Int'l Search Report and Written Opinion from Int'l Appl'n No. PCT/IB2016/055952, dated Feb. 1, 2017.

* cited by examiner

VALVE ASSEMBLY WITH ASSOCIATED MEASUREMENT DEVICE

This application is a National Stage Application of PCT/IB2016/055952, filed 5 Oct. 2016, which claims benefit of Ser. No. 102015000060359, filed 12 Oct. 2015 in Italy and which applications are incorporated herein by reference. To the extent appropriate, a claim of priority is made to each of the above disclosed applications.

TECHNICAL FIELD

The present invention relates to a valve assembly comprising at least one adjustment electronic device, e.g. an electrovalve, particularly suitable for household appliances such as washing machines and/or dishwashers. The valve assembly comprising an associated measurement device, e.g. a flow meter, for measuring a physical quantity associated with a fluid circulating in the valve assembly.

BACKGROUND ART

Valve assemblies are known which comprise an electronic circuit realized on a stripboard, e.g. a PCB, for supporting the electric conductors and electronic devices necessary for controlling the electrovalves.

It is also known, e.g. from United States patent application US2007289647, a valve assembly comprising a device for measuring the fluid flow in the valve assembly itself. According to the solution described in said prior document, just like other prior-art technical solutions, the valve assembly comprises a stripboard, e.g. a PCB, for supporting the electric conductors and electronic devices necessary for controlling the flow meter device. The stripboard or printed circuit board comprising the electrovalve control circuit, whereon electric signals flow, is independent of and distinct from the stripboard comprising the circuit of the flow meter device, whereon electric signals flow.

In prior-art solutions, since two or more stripboards need to be used, a greater effort for properly assembling the valve assembly is required. Moreover, the assembly process is rather complex because each stripboard must be appropriately connected both mechanically and electronically to the valve assembly and to the devices included therein. This aspect implies that high costs need to be incurred for manufacturing the valve assembly.

A further drawback of prior-art solutions lies in the fact that they do not allow reducing the overall dimensions of the valve assembly, since they cannot provide any more compact solutions for the valve assembly.

It is also known to those skilled in the art that electrovalves require, in order to operate correctly, an electric signal having particular physical characteristics (power, frequency, etc.). It is also known to those skilled in the art that measurement devices, e.g. flow meters, manufactured by implementing reed switches, Hall-effect sensors, etc., require, in order to operate correctly, an electric signal having particular physical characteristics (power, frequency, etc.). Therefore, it is known that electrovalves and measurement devices, e.g. flow meters, require different electric signals in order to operate correctly.

As mentioned above, the valve assemblies described in the prior art are devices suitable for household use, and hence they must comply with strict electromagnetic compatibility requirements.

It is known from the patent application US 2009/114865 A1 a solenoid-valve unit for an electropneumatic controller, especially a pilot-control unit of an electropneumatic pressure modulator of a vehicle, includes a solenoid-valve unit having a valve-housing bottom with compressed-air bores, and solenoid valves having solenoids and displaceable magnet armatures. The solenoids are disposed outside of the valve-housing bottom. At least one pressure sensor for measuring pneumatic pressure in a compressed-air bore of the valve-housing bottom is placed in or on the valve-housing bottom. Electric leads to the solenoids and to the pressure sensor are routed to a common electrical interface.

Furthermore, it is known by US 2002/112765 A1 a control device for pressurized fluids includes a valve mechanism that is actuated by a first electric device incorporating a pair of electromagnets disposed in a first housing component, and a second electric device incorporating a printed circuit board for controlling the valve mechanism disposed in a second housing component. A pressure sensor may be disposed in the second housing component such that it forms a plug-type engagement with a port extending from the valve mechanism when the first and second housing components are joined together. The pressure sensor is supported by the circuit board in the second housing component. Electrical contact elements extend from the pressure sensor into, and preferably beyond, holes in the printed circuit board.

SUMMARY OF THE INVENTION

The present invention aims at solving the above-mentioned technical problems by providing an improved valve assembly with an associated measurement device, e.g. a flow meter.

One aspect of the present invention relates to a valve assembly.

A further aspect of the present invention relates to a household device.

Auxiliary features of the present invention are set out herein.

BRIEF DESCRIPTION OF THE DRAWINGS

The features and advantages of the valve assembly and of the household device will become clear and apparent from the following description of at least one embodiment of the valve assembly and from the annexed drawings, wherein:

FIG. 1A is a view from the inlet duct, showing one possible arrangement of the stripboard or printed circuit board with respect to the rest of the elements of the valve assembly, and FIG. 1B is a view from a first and a second outlet ducts, showing from another viewpoint the arrangement of the stripboard shown in FIG. 1A;

FIG. 2A is a front view of the valve assembly from the inlet duct, and FIG. 2B is a side view of the valve assembly;

FIG. 4A is a side sectional view of the valve assembly in the plane A-A, wherein the intermediate portion and an outlet duct of the valve body are partially visible, and FIG. 4B is a side sectional view of the valve assembly in the plane B-B, showing the inlet duct and a part of the intermediate portion of the valve body.

DETAILED DESCRIPTION OF THE INVENTION

Figure 1A:
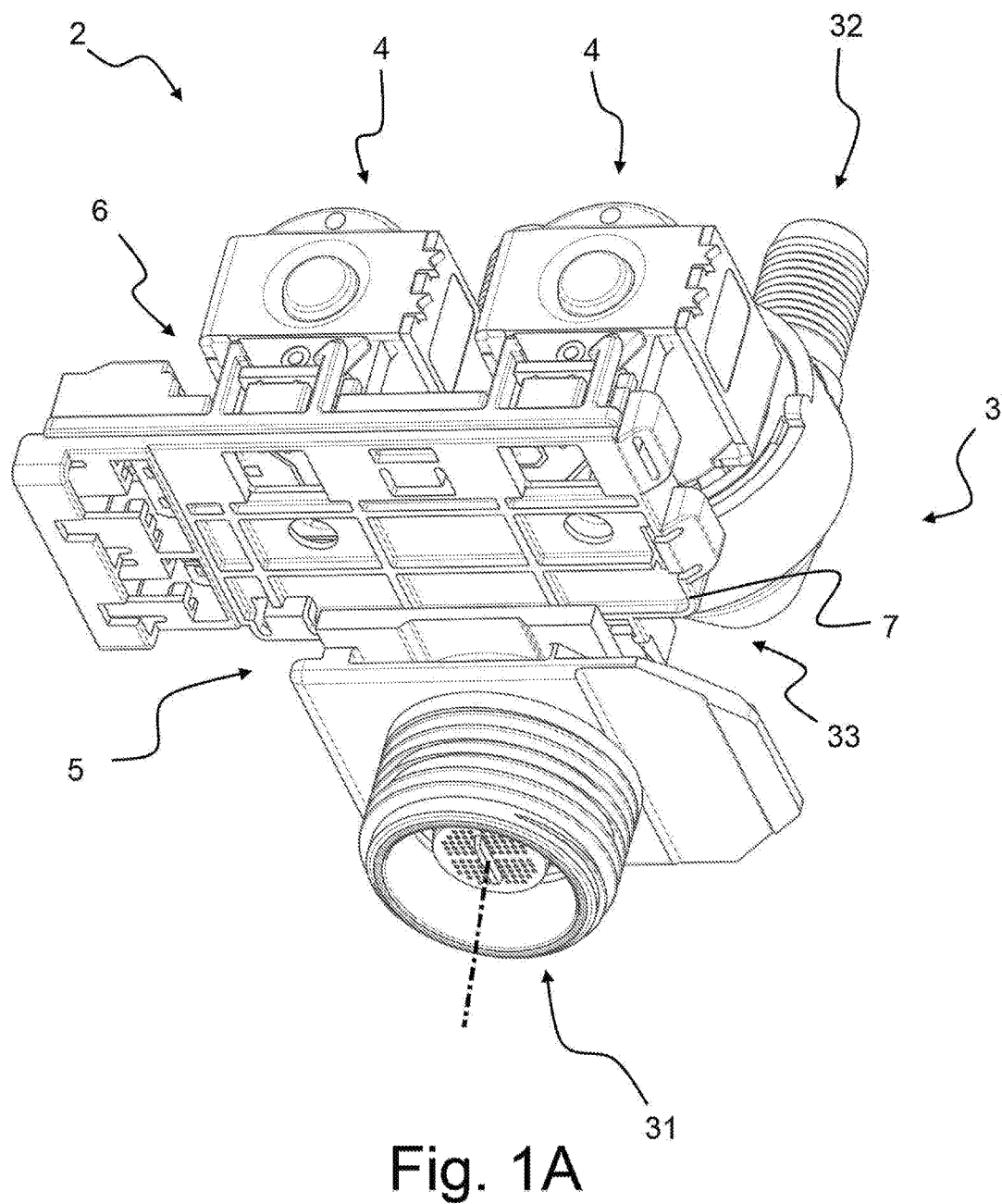
FIGS. 1A and 1B are perspective views of the valve assembly according to the present invention; in particular.

With reference to the above-listed drawings, reference numeral 2 designates as a whole the valve assembly according to the present invention.

The valve assembly 2 according to the present invention comprises a valve body 3, in turn comprising: at least one inlet duct 31; at least one outlet duct 32 and at least one intermediate portion 33, adapted to join said at least one inlet duct 31 and said at least one outlet duct 32. The valve assembly 2 further comprises at least one electronic adjustment device 4, e.g. an electrovalve, located proximal to said at least one intermediate portion 33, adapted to allow, when open, a fluid to flow from said at least one inlet duct 31 towards said at least one outlet duct 32. For simplicity, the electronic adjustment device 4 will hereafter be referred to as electrovalve, though it is clear that it may be any generic electronic adjustment device.

The valve assembly 2, according to the present invention, comprises at least one measurement device 5, directly connected to the valve body 3, e.g. near at least one of said at least one inlet duct 31 and said at least one outlet duct 32. Said at least one measurement device 5 comprises at least one sensor 50 adapted to take a measurement for determining at least one physical characteristic of the fluid that can flow in said valve assembly 2, said fluid being, for example, water.

Said at least one electrovalve 4 comprises a first electronic circuit 42 adapted at least to conduct an electric control signal from a control unit "G" to the same electrovalve 4.

Said at least one measurement device 5 comprises a second electronic circuit 52 adapted at least to conduct the electric signals exchanged between said control unit "G" and said at least one sensor 50.

In general, said control unit "G" is adapted to control all the electronic devices comprised in the valve assembly 2 according to the present invention. Said control unit "G" is normally a part of a device to which said valve assembly 2 can be applied. For example, said control unit "G" is included in a household appliance, e.g. a washing machine or a dishwasher. Said control unit "G" may also be adapted to receive data from said measurement device in order to obtain data about the physical quantity measured by said measurement device.

The valve assembly 2 according to the present invention is so designed that said first electronic circuit 42 and said second electronic circuit 52 are implemented on a single stripboard or printed circuit board 6. Said single stripboard or printed circuit board 6 is in common to said at least one first electronic circuit 42 and said at least one second electronic circuit 52.

With the present solution it is therefore possible to create, through said stripboard or printed circuit board 6, a single support element for the electric connections for both one or more electrovalves 4 and one or more measurement devices 5. The stripboard or printed circuit board 6, according to the present invention, is thus used for both low-voltage devices, such as, for example, at least one measurement device 5, and high-voltage devices, such as, for example, at least one electrovalve 4, both of which are comprised in the valve assembly 2, according to the present invention.

In the valve assembly 2, said at least one electrovalve 4 and said at least one measurement device 5 are, at least partially, mechanically connected directly to said single stripboard or printed circuit board 6.

In one exemplary embodiment, said at least one electrovalve 4 is mechanically and electrically connected to said stripboard or printed circuit board 6 through interference fitting means. The present solution, therefore, allows implementing the electric connection for at least one or more electrovalves 4 without any electric contacts welded to the stripboard, since connections are used which exploit the elasticity of the materials between the electric terminals or contacts of the electrovalve 4 and said stripboard or printed circuit board 6.

In one possible embodiment of the present invention, said stripboard or printed circuit board 6 is implemented by using the PCB technology, which is known to those skilled in the art.

The valve assembly 2 according to the present invention comprises an additional measurement device 8. Said measurement device 8 comprises, in turn, at least one sensor 80. Said sensor 80 is adapted to take a measurement for determining an electric variable of the electronic adjustment device 4.

Said additional measurement device 8 comprises a third electronic circuit 82 adapted to at least conduct the electric signals exchanged between said control unit "G" and said at least one sensor 80.

The valve assembly 2 according to the present invention is so designed that said first electronic circuit 42 and said second electronic circuit 52 and said third electronic circuit 82 are implemented on a single stripboard or printed circuit board 6. Said single stripboard or printed circuit board 6 is common to said at least one first electronic circuit 42 and said at least one second electronic circuit 52 and said third electronic circuit 82.

In one exemplary but non-limiting embodiment, said valve assembly 2 comprises a single support structure 7 adapted to support said stripboard or printed circuit board 6. Preferably, said support structure 7 is fixed directly to the valve body 3. Said support structure 7 is preferably fixed to the valve body 3 through interference fitting elements, e.g. of the joint type. Said support structure is made, for example, of plastic material.

In general, said valve assembly 2 may comprise more than one electrovalve 4, preferably multiple normally-closed solenoid valves. In particular, in one possible embodiment each electrovalve 4 comprises a solenoid 46 and electric contacts 48 for supplying power to the solenoid 46.

Said at least one measurement device 5 may be, for example, a flow meter comprising at least one flow sensor, or a volume meter, e.g. a litre counter. In alternative embodiments, said measurement device 5 is a temperature or pressure meter.

Said measurement device 5 comprises at least one sensor or sensing circuit 50. Said sensor 50 is able to generate an electric signal that depends on the fluid's physical characteristic being measured.

In general, said valve assembly 2 may comprise more than one measurement device 5, each one able to measure a different physical characteristic of the fluid flowing in the valve assembly, e.g. flow, temperature, etc.

Each one of said measurement devices 5 comprises a respective second electronic circuit 52, which is implemented on the single stripboard or printed circuit board 6 that also carries the electronic circuits 52 of the other measurement devices 5.

In one possible embodiment, said sensor 50 may comprise at least one measurement unit 502 outside the valve body 3. In one explanatory embodiment, the measurement unit 502 is a mobile element, e.g. a rotoidal unit, preferably an axial turbine, inserted in the valve body 3, e.g. in the inlet duct 31.

Said measurement unit 502 may be an electronic device as such, and therefore it is electrically connectable to the stripboard or printed circuit board 6, or interacting with the sensor 50, e.g. by making use of magnetic and/or electromagnetic fields.

In one alternative embodiment, said measurement device 5 is completely external to the valve body 3; for example, it only comprising a sensor 50 arranged outside the valve body 3, e.g. surrounding a portion of the valve body 3, such as an inlet duct 31 and/or an outlet duct 32.

Figure 3:
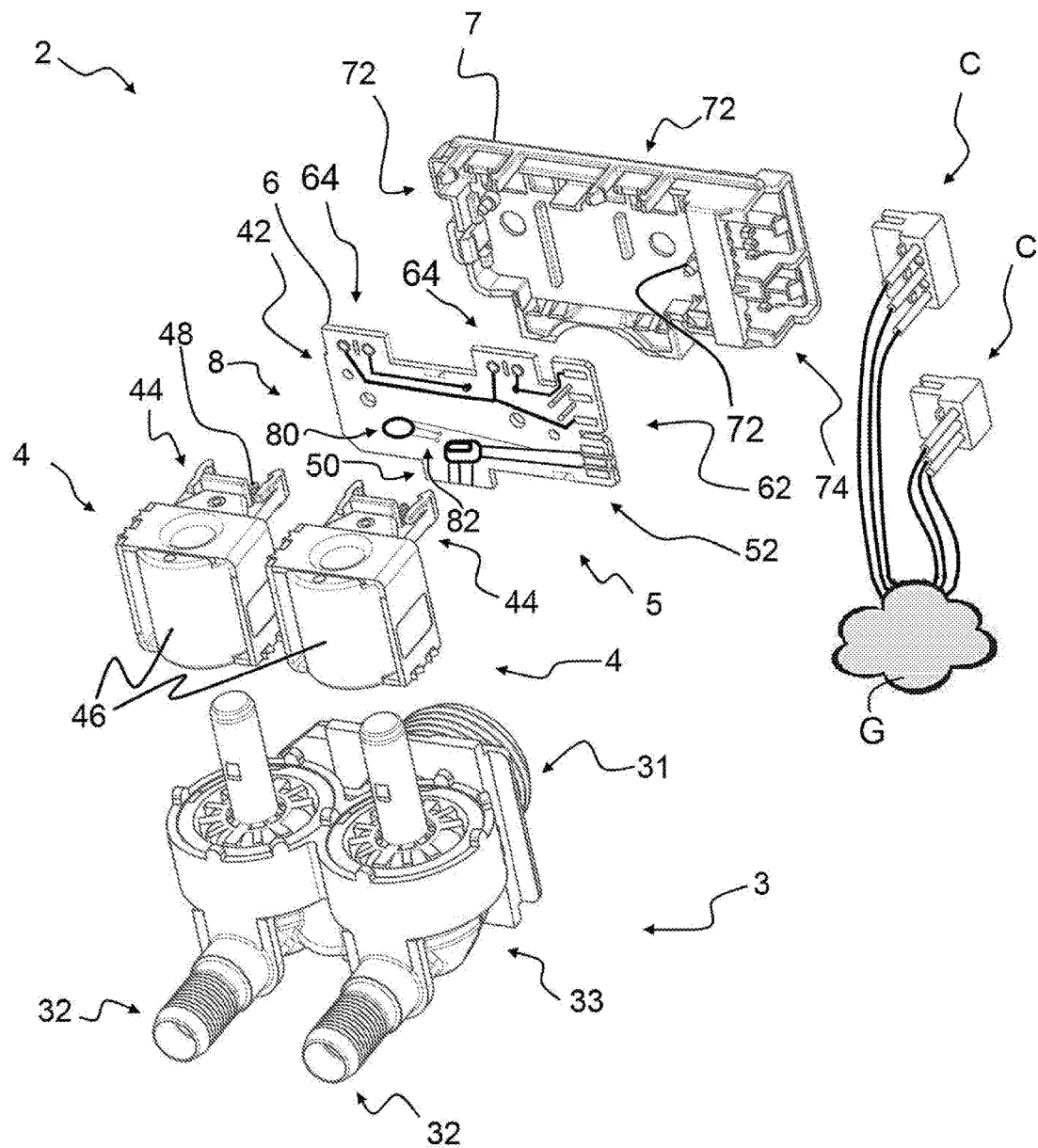
FIG. 3 is an exploded view of the valve assembly according to one possible embodiment thereof, e.g. the embodiment shown in FIGS. 1A and 1B.
Figure 4A:
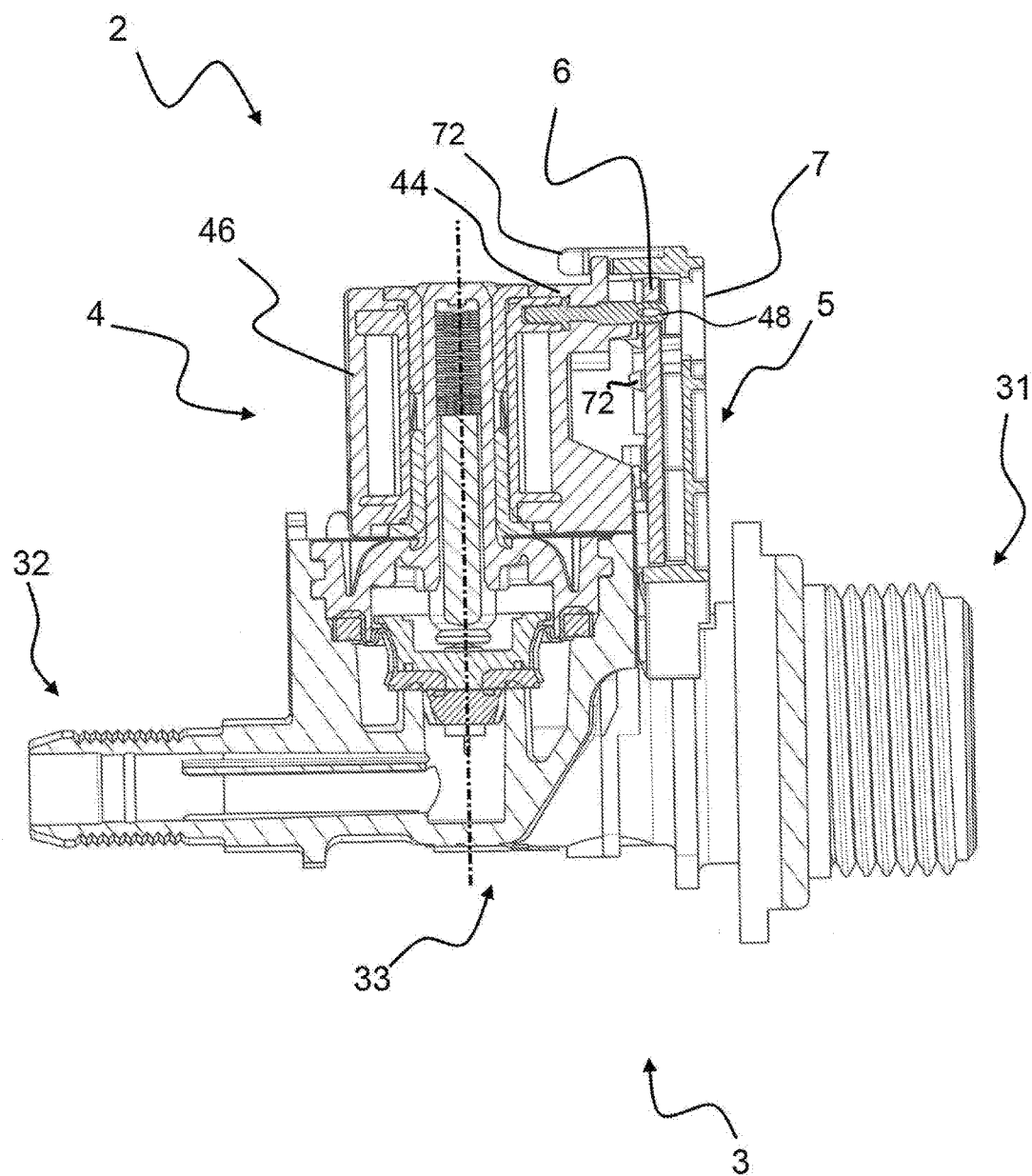
FIGS. 4A and 4B are two sectional views of the valve assembly shown in FIGS. 1A and 1B; in particular.
Figure 4B:
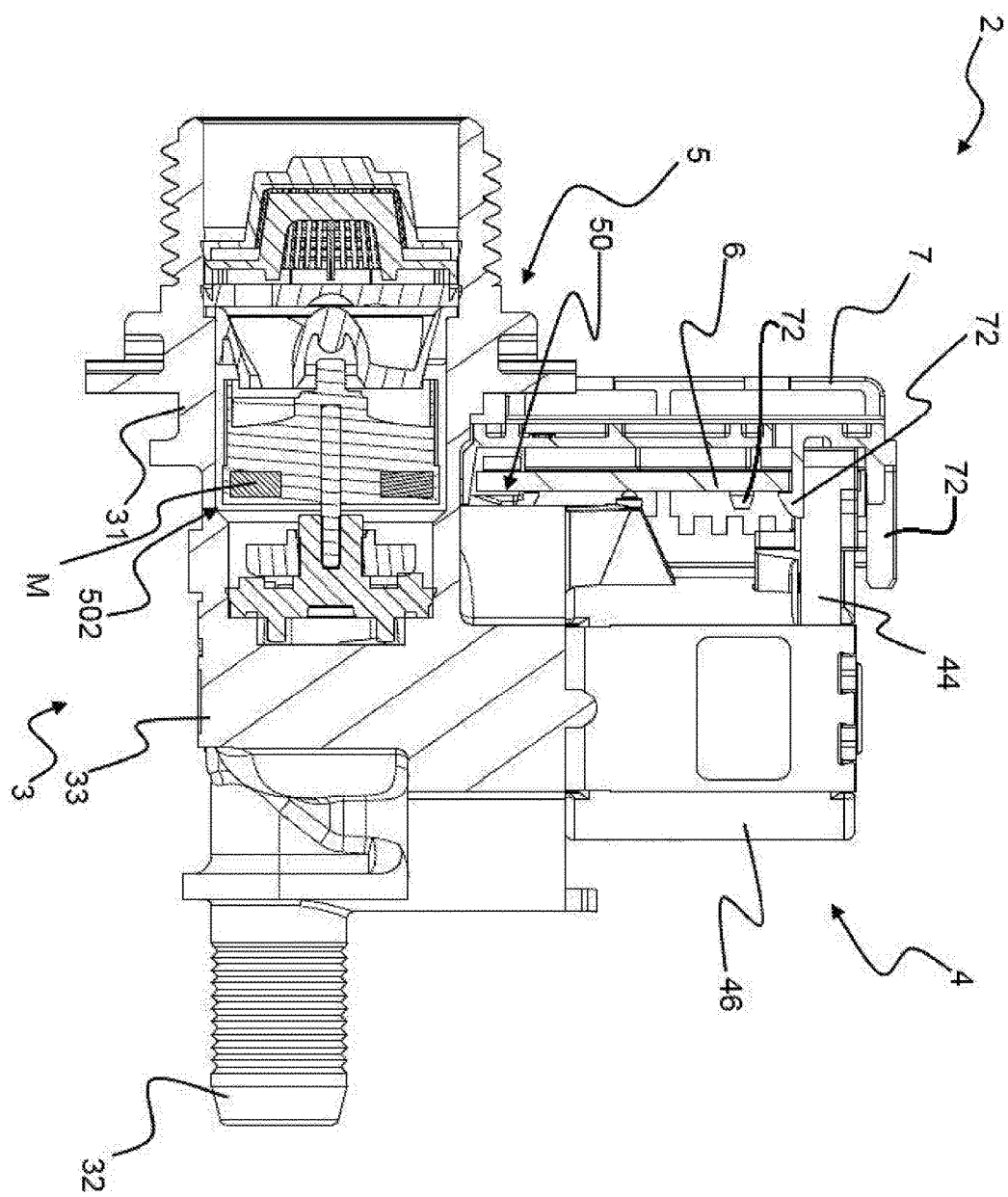

FIGS. 3 and 4B show an embodiment wherein the sensor 50 comprises a portion, i.e. the same sensor 50, secured to the stripboard or printed circuit board 6, and another portion, i.e. the measurement unit 502, arranged inside the valve body 3.

In the embodiment illustrated in the annexed drawings, said at least one measurement device 5 is a flow measurement device or flow meter comprising at least one sensor 50 adapted to take flow measurements. Furthermore, said measurement device 5 comprises a rotoidal measurement unit 502.

In general, the flow measurement device 5 or flow meter may be designed to measure the velocity of the flow or the actual flow rate. In fact, flow meters may be displacement-type meters, with parts put in motion by the flow being measured, or static meters measuring the effect of fluid displacement, without any parts of the meter moving and/or contacting the fluid. Therefore, the measurement device 5, and in particular the sensor 50, may be implemented by using different technologies, e.g. by exploiting the Hall effect or by using the reed switch, Venturi meter, ultrasonic, piezoelectric, or Doppler technologies, etc, all of which are equally suitable for measuring the fluid flow.

In one possible embodiment, said additional measurement device 8 may be, for example, an electronic device capable of measuring an electric quantity generated by the electrovalve 4, e.g. the electric and/or magnetic field.

In general, said sensor 80 can generate an electric signal which is a function of an electric quantity generated by the electrovalve 4.

Said valve assembly 2 may comprise more than one additional measurement device 8, each one capable of measuring an electric quantity generated by the electrovalve 4, e.g. the electric and/or magnetic field.

Each one of said additional measurement devices 8 comprises a respective third electronic circuit 82, which is implemented on the single stripboard or printed circuit board 6 that also carries the electronic circuits 82 of the other additional measurement devices 8.

In one preferred embodiment, said additional measurement device 8 is completely external to the valve body 3; for example, comprising just a sensor 80 arranged outside the valve body 3. In one possible embodiment, said sensor 80 is a magnetic field sensor suitable for detecting the magnetic field emitted, or anyway dispersed, by the solenoid 46 of one or more electrovalves 4. In one possible embodiment, e.g. as shown in FIG. 3, said sensor 80 is located on said stripboard 6.

This embodiment allows detecting, along with the electric signal generated by the measurement device 5 for measuring the fluid flow, whether one or more electrovalves 4 are electrically powered correctly or not.

This additional measurement device 8, therefore, performs a monitoring function on the valve assembly 2, in particular on the operation of the electrovalves 4.

In general, the additional measurement device 8, and in particular the sensor 80, can be implemented by using different technologies, e.g. electric field sensors, magnetic field sensors, direct or induced current sensors, etc.

Said additional measurement device 8 is controlled by said control unit "G", which, in general, is adapted to control all the electronic devices comprised in the valve assembly 2.

Said stripboard or printed circuit board 6 is preferably located proximal to that portion of the valve body 3 where there is said at least one measurement device 5. Said stripboard or printed circuit board 6 must also be in proximity to the electric contacts 48 of the electrovalve 4, in order to provide the electric connection between said one or more electrovalves 4 and said stripboard or printed circuit board 6, in particular without requiring the use of any electric extensions and/or soldering. In this latter embodiment, it is advantageous to position said additional measurement device 8, in particular said sensor 80, near the stripboard 6, which is also proximal to the electrovalve 4.

In one possible embodiment, said stripboard or printed circuit board 6 is so disposed that the plane in which the stripboard or printed circuit board 6 lies is vertical, e.g. perpendicular to the longitudinal extension of the inlet duct 31 of the valve body 3. In particular, said inlet duct 31 extends longitudinally along an axis that is perpendicular to the plane in which said stripboard or printed circuit board 6 lies. In an alternative embodiment (not shown), said stripboard 6 lies in a horizontal plane, e.g. perpendicular to the plane in which the stripboard included in the embodiment shown in the annexed drawings lies.

In general, the arrangement of the stripboard 6 relative to the valve body 3 depends on the disposition of the measurement devices 5 and on the technology employed for their implementation.

In one possible embodiment, said support structure 7 comprises interference fitting elements 72 adapted to retain said stripboard or printed circuit board 6, thus ensuring a mechanical coupling. Said interference fitting elements 72 may also be used for providing a mechanical coupling for retaining said at least one electrovalve 4.

Such a solution speeds up the assembling of the valve assembly 2 because no fasteners (e.g. screws) need to be tightened after positioning the parts of the valve assembly 2.

Furthermore, said electrovalve 4 comprises second interference fitting elements 44 for mechanically fastening said electrovalve 4 to the stripboard or printed circuit board 6.

Said second interference fitting elements 44 may also be suitable for being mechanically secured to said support structure 7 in order to mechanically fasten the respective electrovalve 4.

Said at least one electrovalve 4 is electrically connected to the stripboard or printed circuit board 6 via interference fitting means according to the so-called press-fit technology. In particular, said at least one electrovalve 4 is electrically connected to the first electric circuit 42 comprised in the stripboard or printed circuit board 6 via interference fitting means according to the so-called press-fit technology. In particular, said electric contacts 48 comprised in the electrovalve 4 are so designed as to mechanically interfere with the corresponding first electronic circuit 42 comprised in the stripboard 6, so as to provide an electric connection.

The so-called "press fit" technology provides optimized connections, thereby reducing the number of assembly operations and the number of electric wires or conductors, without requiring any soldering between the connected parts, such as, for example, the solenoid or coils and the stripboard or PCB 6, in order to ensure the electric connection. The press fit technology also allows withstanding assembling and handling stresses and, most importantly, vibrations that may be generated in the household appliance whereto the valve assembly 2 of the present invention may be applied. For example, if the valve assembly 2 is applied to a washing machine, the vibrations generated by the household appliance during the various wash cycles, in particular during the spin step, will cause no electric disconnections, which is a very important problems that has not yet been fully solved by prior-art solutions.

In general, said stripboard or printed circuit board 6 comprises at least one connection portion 62 comprising one or more sockets for connecting respective plugs for supplying power to the electronic devices electrically connected to the stripboard or printed circuit board 6. Preferably, said stripboard or printed circuit board 6 comprises a single connection portion 62 in which a plurality of sockets are placed for connecting respective plugs for controlling and/or supplying power to the electronic devices connected to the same stripboard.

Into said sockets, respective plugs "C" can be inserted, which in turn are electrically connected to said control unit "G".

In one possible embodiment, the support structure 7 is so shaped as to form the mechanical structure of said sockets 74, e.g. the housing for said plugs "C". In general, the conformation of the sockets and plugs depends on the standards employed for manufacturing the electronic devices and on the national regulations in force.

In general, the solution according to the present invention allows positioning the connection portion 62 and also, for example, said sockets 74, in a predetermined place so as to further facilitate the assembling of the valve assembly 2 and its electric connection to the control unit "G".

In one possible exemplary but non limiting embodiment, the support structure 7 comprises fastening portions adapted to secure the valve assembly 2 to another device, e.g. for mechanically fastening the valve assembly to a household device, thus further reducing the space occupied by the valve assembly within a household device.

The annexed drawings illustrate a preferred, though non-limiting, embodiment. The valve assembly 2, as shown in the drawings, comprises at least two electrovalves 4 arranged proximal to said at least one intermediate portion 33. Each electrovalve 4 is adapted to allow, when open, a fluid to flow from said at least one inlet duct 31 towards a respective outlet duct 32. The technical/hydraulic operation of the valve assembly 2 illustrated in the annexed drawings will not be described in detail, since it can clearly be inferred from the annexed drawings by a man skilled in the art.

In general, said valve assembly 2 may comprise two or more electrovalves 4, each one comprising a first electronic circuit 42, each one implemented on a single stripboard or printed circuit board 6 that also carries the first electronic circuits 42 of the other electrovalves 4.

Still with reference to the embodiment illustrated in the drawings, FIG. 1A is a view of the valve assembly 2 from the inlet duct 31, showing one possible arrangement of the stripboard or printed circuit board 6 with respect to the rest of the elements of the valve assembly 2. In the illustrated embodiment, the measurement device 5 is located in proximity to the inlet duct 31. In alternative embodiments, there are several inlet ducts 31, each one associable with one measurement device 5.

The solution illustrated in the drawings has clear technical advantages in terms of both assembly time and compactness of the valve assembly 2.

Figure 1B:
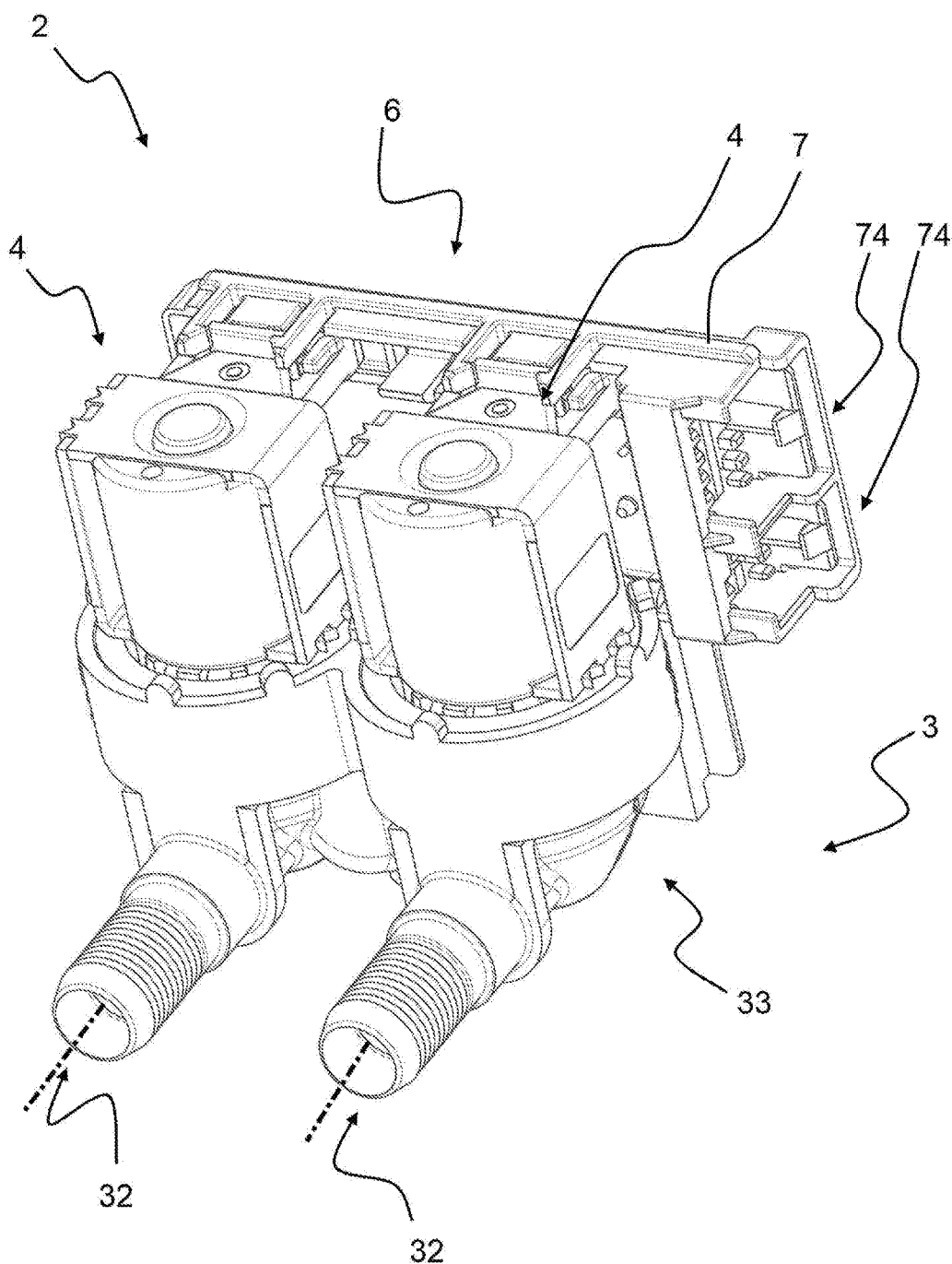

FIG. 1B shows the valve assembly 2 as viewed from a first and second outlet ducts 32. In this drawing, it is possible to appreciate the technical advantage of being able to provide a single connection portion 62 on the stripboard 6, located in a single place, into which a plurality of sockets 74 can be disposed in order to connect respective plugs "C", thus speeding up the procedures for assembling and connecting, in particular electrically connection, the valve assembly 2 to a household appliance. The present solution contributes to making the valve assembly 2 more compact. In this image one can appreciate one possible solution for the position of the electrovalves 4, in particular along an axis perpendicular to the axis defined by the outlet ducts 32. Such a solution advantageously allows making a more complex valve assembly 2 that comprises more than one electrovalves 4. A valve assembly 2 thus made may be used as a collector for one or more fluids, wherein the first electronic circuits 42 for supplying power to each electrovalve 4 can be disposed on a single stripboard or printed circuit board 6, the latter being also able to include the second electric circuits 52 of the measurement devices 5, e.g. associated with one or more inlet ducts 31. The same stripboard 6 may comprise, in one possible embodiment, said at least one additional measurement device 8.

Figure 2A:
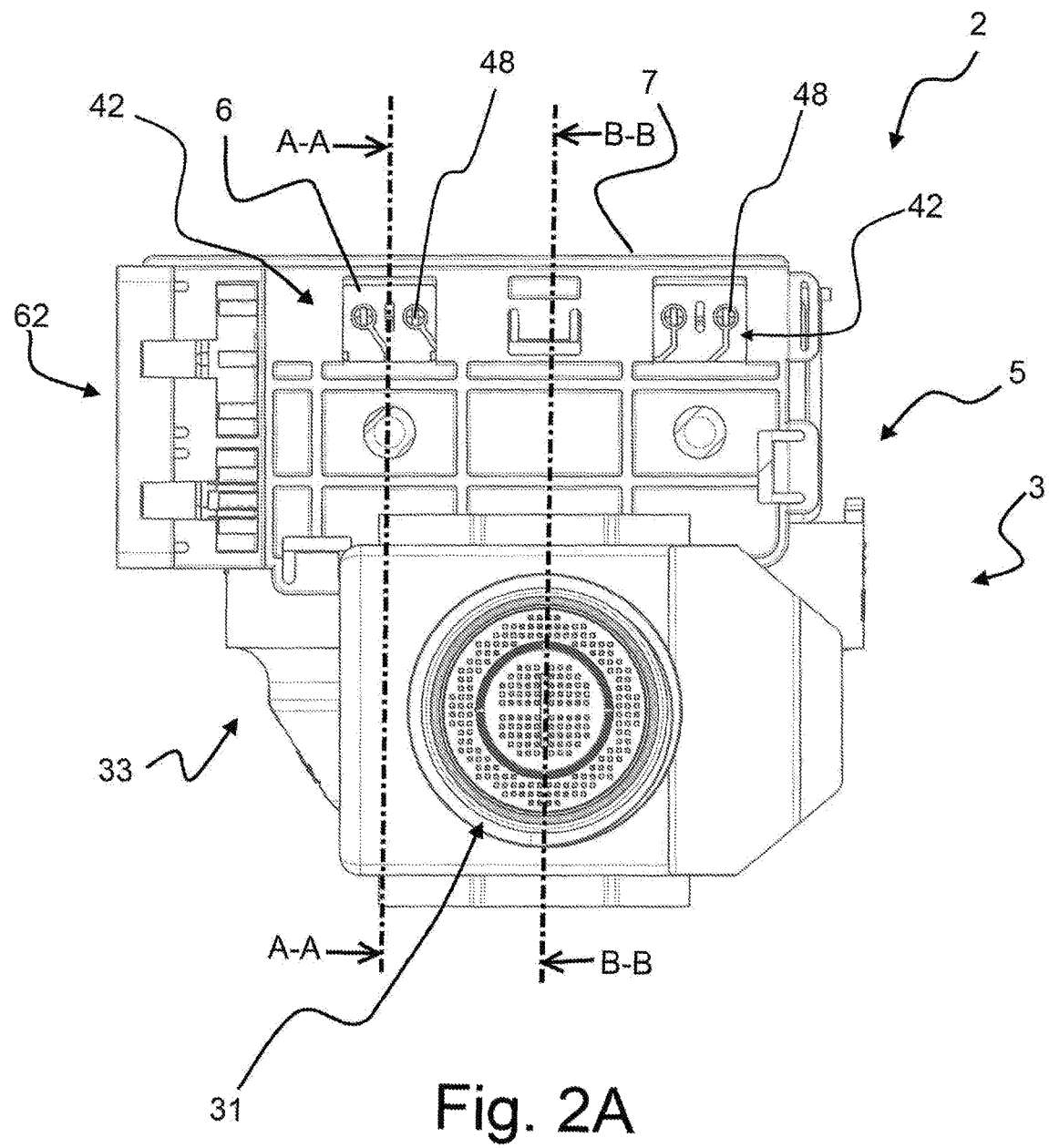
FIGS. 2A and 2B are front views of the valve assembly shown in FIGS. 1A and 1B; in particular.

FIG. 2A shows one possible embodiment that provides the electric connection via interference fitting elements, as well as the mechanical connection of the stripboard or printed circuit board 6 and of the support structure 7 with the valve body 3. One can see, in fact, the electric contacts 48 of the electrovalves 4, which go through suitable metallized holes formed in the stripboard or printed circuit board 6, so that the interferential effect between the electric contacts 48 and the metallization of the holes in the stripboard 6 can create and maintain an electric connection between the first electric circuit 42 on the stripboard or printed circuit board 6 and the electric contacts 48 of the electrovalve 4.

Figure 2B:
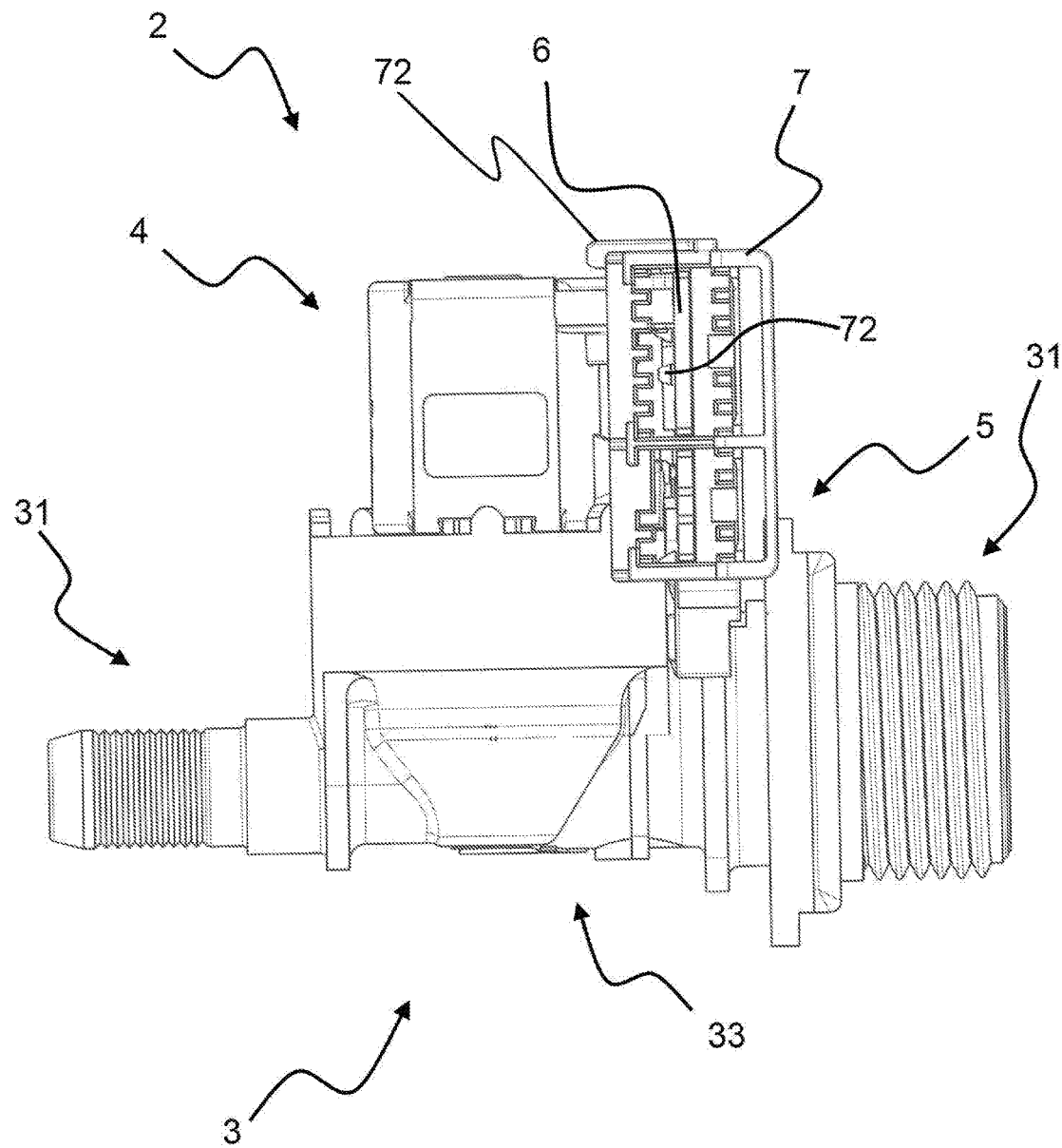

FIG. 2B shows a side view of the valve assembly to illustrate one possible embodiment of the fitting elements 72 for providing the mechanical connection at least between the electrovalve 4 and the support structure 7. This connection solution partially allows to relieve the printed circuit board 6 from having to ensure mechanical sealing, whilst ensuring the electric connection between the electrovalve 4 and the printed circuit board 6.

FIG. 3 shows an exploded view of the valve assembly to better illustrate one possible embodiment of the valve assembly 2, in particular the electric and mechanical connections between the stripboard or printed circuit board 6 and the electrovalve 4 and between the stripboard or printed circuit board 6 and the support structure 7, as well as the mechanical connection between the support structure 7 and the electrovalves 4.

According to the exemplary and non-limiting embodiment illustrated herein, the electric connection between the electrovalve 4 and the stripboard or printed circuit board 6 is accomplished by using suitably shaped electric contacts 48, as shown by way of example in FIG. 4A; whereas the mechanical connection between each electrovalve 4 and the stripboard 6 is accomplished by using said second fitting elements 44, provided in the form of arms appropriately shaped for fitting by interference to the stripboard or printed circuit board 6. On the other side, the stripboard or printed circuit 6 comprises, for example, a shaped portion 64 that can be fitted between said arms when the electrovalve is mounted to the stripboard 6. The same second fitting elements 44 comprise also a flange adapted to be connected to respective first fitting elements 72 comprised in the support structure 7.

Additional first fitting elements 72 for securing the stripboard or printed circuit board 6 to the same support structure 7 are provided in plug form, so that they can be inserted into matching holes formed in the stripboard 6. On the other hand, the first fitting elements 72 for securing the electrovalve 4 to the support structure 7 are shaped, for example, as arms that fit into said flange comprised in the second fitting elements 44 of the electrovalve 4.

Said sockets 74 are so shaped as to be able to receive the respective plugs "C" in order to establish an electric connection between said electronic circuits (42, 52, 82), comprised in said stripboard 6, and said control unit "G".

FIG. 3 illustrates an exemplary embodiment that includes both a measurement device 5, for measuring the fluid flow in the valve assembly 2, and an additional measurement device 8, for measuring the electric and/or magnetic field irradiated by the electrovalve 4.

FIG. 4A, which shows a side sectional view of the valve assembly in the plane A-A, illustrates one possible embodiment of the electrovalve 4. The illustrated embodiment shows a diaphragm-type electrovalve. Alternative embodiments may use disk-type electrovalves 4.

In FIG. 4A it is also possible to identify one possible embodiment of the electric connection between the electrovalve 4 and the stripboard or printed circuit board 6. FIG. 4A further illustrates an embodiment of a mechanical connection between the electrovalve 4, the stripboard or printed circuit board 6 and the support structure 7.

In general, all of the mechanical and electrical connections illustrated so far are of the interferential type, thus avoiding the need for soldering the electric contacts 48 to the stripboard 6 in order to establish the electric connections.

In the embodiment shown in the drawings, the electrovalves 4 comprise an electric contact system such that the electric contacts 48 extend perpendicularly to the longitudinal axis of the solenoid 46. In this embodiment, said electric contacts 48 are so shaped as to provide an electric connection to the stripboard or printed circuit board 6 by mechanical interference, by exploiting the intrinsic elasticity of the metal, e.g. copper, that the electric contacts 48 are made of. In the illustrated embodiment, said electric contacts 48 comprise an aperture, such that, prior to the electric connection of the electrovalve 4 to the stripboard 6, the width of said electric contacts 48 is greater than the diameter of the metallized holes in the stripboard 6. Thanks to the elasticity of the metal of the electric contacts 48, the aperture comprised in the electric contacts 48 allows the electric contact to become deformed and enter into the metallized hole, so that the electric contact 48 itself exerting a constant pressure against the walls of the metallized hole comprised in the stripboard or printed circuit board 6, thus ensuring the electric connection.

In FIG. 4B, which shows a side sectional view of the valve assembly in the plane B-B, one can appreciate one possible embodiment of the measurement device 5. The illustrated embodiment shows a measurement device 5 suitable for measuring a fluid flow. Therefore, the sensor 50 is a flow sensor, comprising, in particular, a turbine-type measurement unit 502. Said sensor 50 is secured to the printed circuit board 6 as said turbine is placed inside the inlet duct 31 of the valve body 3, since said inlet duct 31 acts as a support structure for the turbine. Said turbine comprises a blade rotor rotatably mounted to a shaft fixed to the valve body 3 through a support element. The illustrated embodiment comprises magnetic elements, in particular permanent magnets "M", secured to the outer periphery of the blades and capable of influencing the sensor 50, e.g. a reed relay, which changing its state every time said magnets "M" come close thereto, as is known to those skilled in the art. The signal generated by the sensor 50, in particular the frequency thereof, will then be proportional to the revolution speed of the turbine, thus allowing the determination of the fluid flow through the inlet duct 31. The illustrated embodiment advantageously comprises a flow stabilizer element that can establish a laminar flow of fluid in proximity to the turbine. Such element will not be described in detail herein, since it is already known to those skilled in the art, and its technical features can be easily inferred from the annexed drawings.

In general, said valve assembly 2 according to the present invention may comprise one or more electrovalves 4 and one or more measurement devices 5. Furthermore, the valve assembly 2 according to the present invention may comprise one or more additional measurement devices 8.

The respective electronic circuits (42, 52, 82) of said one or more electrovalves 4 and said one or more measurement devices 5 and/or said one or more additional measurement devices 8 are implemented on a single stripboard or printed circuit board 6.

In general, said first electronic circuit 42 and said second electronic circuit 52 are implemented in such a way as to comply with electromagnetic compatibility requirements, since they are comprised in a valve assembly 2 according to the present invention, which can be used in a household appliance, i.e. in a household environment. Likewise, also said third electronic circuit 82 is implemented in such a way as to comply with electromagnetic compatibility requirements. The valve assembly 2 is therefore applicable to a device for household use.

The valve assembly 2 according to the present invention is particularly suited for application to household appliances comprising a circuit for circulating a fluid, e.g. water.

The present invention provides a valve assembly comprising a single printed circuit board that includes circuits for measuring and/or controlling the valve assembly itself.

Said household device may be a washing machine, a dishwasher or any other device wherein a fluid must flow, and wherein measurements need to be taken on the same fluid.

Other embodiments which are alternative to the one illustrated herein should be considered to fall within the scope of the present invention, since they include variations that will be obvious to those skilled in the art.

| REFERENCE NUMERALS | |
|---|---|
| Valve assembly | 2 |
| Valve body | 3 |
| Inlet duct | 31 |
| Outlet duct | 32 |
| Intermediate portion | 33 |
| Electrovalve | 4 |
| First electronic circuit | 42 |
| Second fitting elements | 44 |
| Solenoid | 46 |
| Electric contacts | 48 |
| Measurement device | 5 |
| Sensor | 50 |
| Measurement unit | 502 |
| Second electronic circuit | 52 |
| Stripboard or printed circuit board | 6 |
| Connection portion | 62 |
| Shaped portion | 64 |
| Support structure | 7 |

-continued

| REFERENCE NUMERALS | |
|---|---|
| First fitting elements | 72 |
| Sockets | 74 |
| Additional measurement device | 8 |
| Sensor | 80 |
| Third electronic circuit | 82 |
| Control unit | G |
| Plugs | C |
| Permanent magnets | M |
| Barzanò & Zanardo Milano S.p.A. | |

The invention claimed is:

1. A valve assembly for household appliances, said valve assembly comprising:
   a valve body comprising: one inlet duct; at least one outlet duct and at least one intermediate portion for joining said one inlet duct and said at least one outlet duct;
   at least two electrovalves located proximal to said at least one intermediate portion, each of the electrovalves adapted to allow, when open, a fluid to flow from said one inlet duct towards a respective outlet duct;
   at least one measurement device, directly connected to the valve body; said at least one measurement device comprises at least one sensor adapted to take a flow measurement of the fluid flowing in said valve assembly;
   each of the electrovalves comprises a first electronic circuit at least adapted to conduct an electric control signal from a control unit to the respective electrovalve;
   said at least one measurement device comprises a second electronic circuit at least adapted to conduct the electric signals exchanged between said control unit and said at least one sensor;
   said first electronic circuits and said second electronic circuit are implemented on a single stripboard or printed circuit board;
   said at least two electrovalves and said at least one measurement device are mechanically connected directly to said single stripboard or printed circuit board.

2. A valve assembly according to claim 1, comprising an additional measurement device comprising at least one sensor adapted to take a measurement for determining an electric variable of the electronic adjustment device; said additional measurement device comprising a third electronic circuit adapted to conduct electric signals exchanged between said control unit and said at least one sensor.

3. A valve assembly according to claim 1, comprising a single support structure adapted to support said stripboard or printed circuit board; said support structure being directly secured to the valve body.

4. A valve assembly according to claim 1, wherein said at least one electronic adjustment device is at least one electrovalve, which is mechanically and electrically connected to said stripboard or printed circuit board via interference fittings.

5. A valve assembly according to claim 3, wherein said support structure comprises interference fitting elements for retaining said stripboard or printed circuit board and/or said at least one electrovalve.

6. A valve assembly according to claim 4, wherein said electrovalve comprises interference fitting elements for mechanically fastening said at least one electrovalve to the stripboard or printed circuit board.

7. A valve assembly according to claim 4, wherein the electric connection of said at least one electrovalve to the stripboard or printed circuit board is established via interference fitting means using press-fit technology.

8. A valve assembly according to claim 1, wherein said stripboard or printed circuit board comprises a single connection portion, in which a plurality of sockets are placed for connecting respective plugs for controlling and/or supplying power to the electronic devices connected to the stripboard or printed circuit board.

9. A household appliance comprising a circuit for circulating a fluid, wherein said circuit for circulating a fluid comprises a valve assembly according to claim 1.

10. A valve assembly according to claim 1, said at least one sensor being arranged outside the valve body.

11. A valve assembly according to claim 1, wherein said measurement device is completely external to the valve body.

12. A valve assembly according to claim 1, wherein said flow measurement device is located proximate to said one inlet duct.

* * * * *